DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900. O.G. 1230

T900,017

STRIPPABLE COATING COMPOSITION

Travis L. Gordy, Ponca City, Okla., assignor to Continental Oil Company, Ponca City, Okla.

Continuation of application Ser. No. 780,260, Nov. 29, 1968. This application Mar. 22, 1971, Ser. No. 126,978

Int. Cl. B65b *33/00, 33/04*

U.S. Cl. 117—6

No Drawing. 16 Pages Specification

Compositions are described which are useful for providing a strippable protective coating on various substrates (e.g. automobile moldings). The compositions comprise petroleum wax, ethylene-isobutyl acrylate copolymer, ethylene-vinyl acetate copolymer and a rosin ester. Suitable ethylene-isboutyl acrylate copolymers contain about 20 to about 32 weight percent isobutyl acrylate and have a melt index of about 0.5 to about 260. Suitable ethylene-vinyl acetate copolymers contain about 18 to about 29 percent by weight vinyl acetate and have a melt index of from about 0.5 to about 250. Suitable rosin esters are the glycerol and pentaerythritol ester of rosins such as pale wood rosin, hydrogenated rosin and polymerized rosin. The substrate can be made of aluminum, anodized aluminum, painted aluminum, stainless steel, vinyl, acrylonitrile-butadiene-styrene (ABS) polymer or various combinations of these materials. The various materials can be present in the following amounts (parts by weight): petroleum wax—30 to 60; ethylene-isobutyl acrylate copolymer—15 to 40; ethylene-vinyl acetate copolymer—10 to 40; rosin esters—5 to 20.